(12) United States Patent
Angal et al.

(10) Patent No.: US 7,619,783 B2
(45) Date of Patent: Nov. 17, 2009

(54) SCANNER ANALOG-FRONT-END CALIBRATION USING PERCENT OF FREEDOM

(75) Inventors: Aditya J. Angal, Lexington, KY (US); Matthew D. Carter, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 666 days.

(21) Appl. No.: 11/270,360

(22) Filed: Nov. 9, 2005

(65) Prior Publication Data

US 2007/0103734 A1    May 10, 2007

(51) Int. Cl.
G02B 23/08    (2006.01)
(52) U.S. Cl. ........................ 358/406; 358/474
(58) Field of Classification Search ................ 358/406, 358/444, 465, 466; 382/274
See application file for complete search history.

(56) References Cited

U.S. PATENT DOCUMENTS

| | | | |
|---|---|---|---|
| 4,155,252 A | 5/1979 | Morrill | |
| 5,303,064 A * | 4/1994 | Johnson et al. | 358/406 |
| 6,249,360 B1 | 6/2001 | Pollard et al. | |
| 6,408,259 B1 | 6/2002 | Goebel et al. | |
| 6,571,189 B2 * | 5/2003 | Jensen et al. | 702/104 |
| 6,618,171 B1 * | 9/2003 | Tse et al. | 358/446 |
| 6,859,204 B2 | 2/2005 | Curry et al. | |
| 6,879,923 B2 | 4/2005 | Butler | |
| 6,914,229 B2 | 7/2005 | Corson et al. | |
| 2002/0169574 A1 * | 11/2002 | Jensen et al. | 702/104 |
| 2007/0103734 A1 * | 5/2007 | Angal et al. | 358/406 |

* cited by examiner

Primary Examiner—Twyler L Haskins
Assistant Examiner—David L Suazo
(74) Attorney, Agent, or Firm—Elizabeth C. Jacobs

(57) ABSTRACT

A method and a system of calibrating a scanner that has a scanning element. The method includes scanning data with the scanning element, and determining an intermediate value of the scanned data. The method also includes determining a variation value of the scanning element, and determining a data freedom value based on the intermediate value and the variation value.

20 Claims, 10 Drawing Sheets
(2 of 10 Drawing Sheet(s) Filed in Color)

SCANNER ANALOG-FRONT-END CALIBRATION USING PERCENT OF FREEDOM

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. FIELD OF THE INVENTION

The invention relates generally to scanners and scanning methods, and more particularly to those having or using a scan bar.

2. DESCRIPTION OF THE RELATED ART

A typical stand-alone scanner or multifunction scanner/printer uses a scan bar to acquire image data. The scan bar generates an analog signal that represents the image data. The scanner then converts the analog signal into its digital equivalent using an analog-front-end ("AFE") circuit. Typically, the AFE is an analog integrated circuit that samples the analog signal from the scan bar and converts the sampled analog signal into digital image data for subsequent use by a computer or a processor.

AFE circuits have limitations with respect to the signals they can convert to digital form. For example, most circuits are limited to processing input signals that fall within a certain range, for example, a range of 0V to 3V. High quality scans can be achieved when the AFE is able to use this entire range for analog to digital conversion. However, scan bar outputs rarely match the range of available AFEs. Therefore, adjustments must be made to accommodate this mismatch. Most often, the analog signal from the scan bar is modified with offset and gain adjustments. In some cases, offset and gain parameters may be programmed into the AFE. The offset and gain are applied to the analog signal via respective subtraction and multiplication processes. Determining the offset and gain generally involves scanning a set of target image data (or target) under different conditions. For example, the target is first scanned with no illumination (a "dark" condition scan), followed by a scan with a predetermined level of illumination (a "white" condition scan). Typically, the predetermined level of illumination is obtained from some calibration parameters of an illumination source, and the target is a white calibration strip.

Once target image data has been acquired under the "dark" and "white" conditions, the AFE can be calibrated by different techniques. For example, a minimum point from the "dark" condition scan is initially searched and obtained, and set to be the offset. Similarly, a maximum point from the "white" scan is searched and obtained. The offset is subsequently subtracted from the maximum point. An upper limit of the dynamic range of the AFE is divided by the difference between the offset and maximum point to yield a quotient. The quotient is used as the gain.

Another calibration technique requires determining an average or a rolling or moving average from the set of target data during the dark condition scan. (A rolling or moving average is generally obtained from averaging a weighted subset or window of the target data such that the average is biased towards a maximum or minimum.) Subsequently, a set of predetermined "dark" and "white" target values are determined. The "dark" target value is subtracted from the average to obtain another difference. This difference is used as the offset. Similarly, a second average or a second rolling or moving average from the set of target data during the white condition scan is obtained. The offset is then subtracted from the second average to obtain a third difference. The "white" target value is divided by the third difference and the result or quotient is used as the gain.

SUMMARY OF THE INVENTION

Although calibration techniques exist, determining a set of accurate "dark" and "white" target values affects the calibration, and thus the scan quality. For example, if the "white" target value is incorrectly chosen (that is, if the "white" target value is set too close to the upper limit of the dynamic range of the AFE), clipping of the analog signal occurs. Particularly, after the analog signal is multiplied by the gain derived from the incorrect "white" target value, values of some of the analog signals are above the upper limit of the dynamic range of the AFE. As a result, some values of the digital signal are clipped to the upper limit. This degrades scan quality.

Accordingly, one embodiment of the invention provides a method of calibrating an AFE by considering some operating parameters of the scan bar, different averaging techniques, calibration failures, and a percent of freedom (discussed in more detail below). In this way, the AFE can be correctly and adequately calibrated.

In one form, the invention provides a method of calibrating a scanner that has a scanning element. The method includes scanning data with the scanning element, and determining an intermediate value of the scanned data. The method also includes determining a variation value of the scanning element, and determining a data freedom value deliverable by the scanning element based on the intermediate value and the variation value.

In another form, the invention provides a method of calibrating a scanner that has a scanning element. The method includes determining a signal range of the scanning element, and determining an average of a set of image data. The method also includes determining a data freedom value based on the average, the image data, and the upper and lower ranges, and adjusting data to be generated by the scanning element based on the data freedom value.

In another form, the invention provides a scanner that includes a scanning element, a memory, an averaging module, and a processing unit. The scanning element is configured to acquire data. The memory stores a variation value of the scanning element. The averaging module receives the scanned data, and determines an intermediate value of the scanned data. The processing unit determines a data freedom value deliverable by the scanning element based on the intermediate value and the variation value.

BRIEF DESCRIPTION OF THE DRAWINGS

The patent or application file contains at least one drawing executed in color. Copies of the patent or patent application publication with color drawings(s) will be provided by the Office upon request and payment of the necessary fee.

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
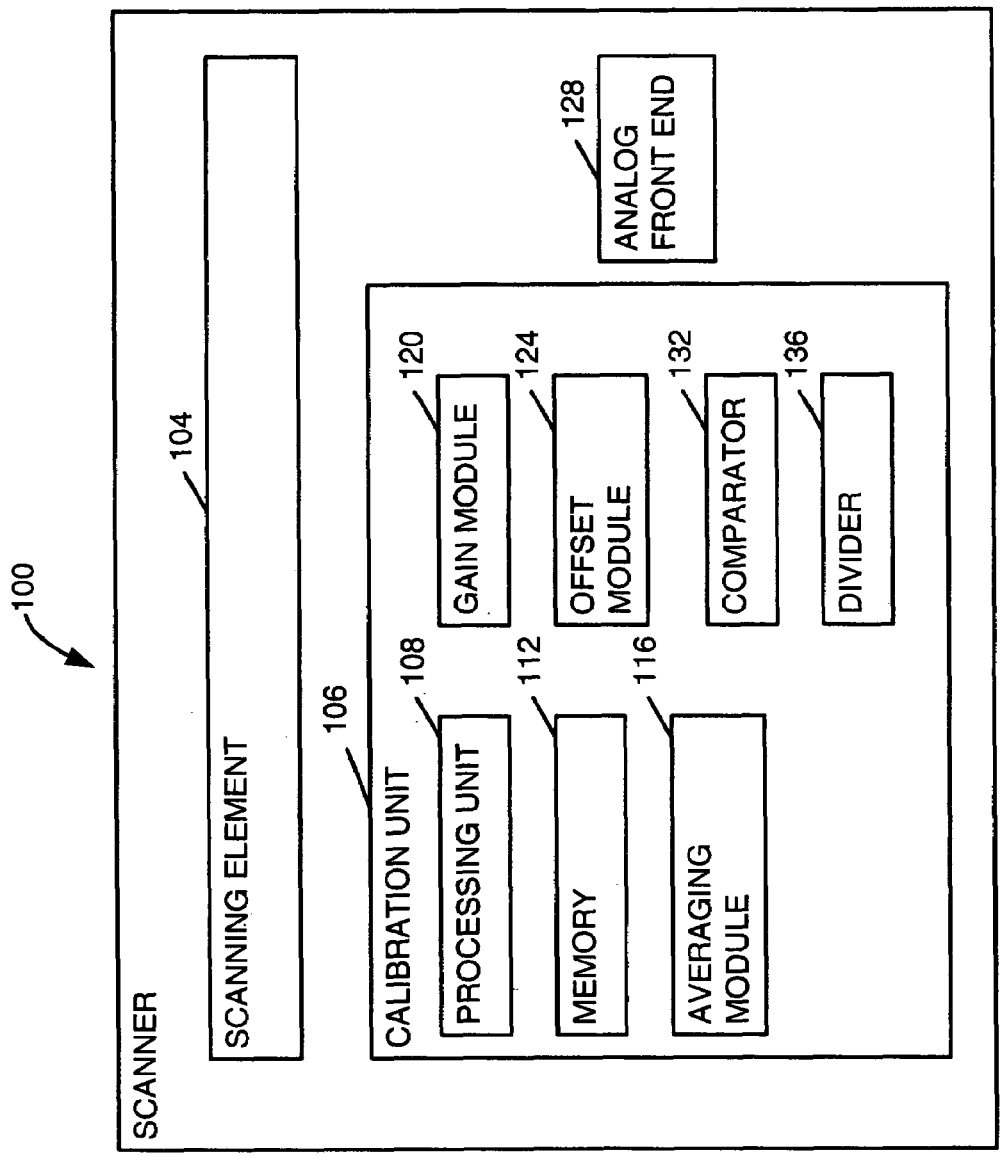
FIG. 1 is an exemplary scanner.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

In addition, it should be understood that some embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention.

Some of the systems shown in the figures are models of what actual systems might be like. Some of the modules and logical structures described are capable of being implemented in software executed by a microprocessor or a similar device or of being implemented in hardware using a variety of components including, for example, application specific integrated circuits ("ASICs"). Terms like "processor" or "processing unit" may include or refer to both hardware and/or software. In addition, throughout the specification capitalized terms are used. Such terms are used to conform to common practices and to help correlate the description with the coding examples, equations, and/or drawings. However, no specific meaning is implied or should be inferred simply due to the use of capitalization.

Scan bars are well known. Nonetheless, a brief overview of such devices is provided.

There are at least two types of scan bars: an optical reduction type that uses a combination of a lens, mirrors, and a charged-coupled-device ("CCD") array; and a contact image sensor ("CIS") type.

A CCD array is a collection of tiny, light-sensitive diodes, which convert photons into electrons. These diodes are called photosites—the brighter the light that hits a single photosite, the greater the electrical charge that will accumulate at that site. The image of the document that is scanned using a light source such as a fluorescent bulb reaches the CCD array through a series of mirrors, filters and lenses. The exact configuration of these components will depend on the model of scanner. Some optical reduction scanners use a three-pass scanning method. Each pass uses a different color filter (red, green or blue) between the lens and CCD array. After the three passes are completed, the scanner software assembles the three filtered images into a single full-color image. Most optical reduction scanners use the single-pass method. The lens splits the image into three smaller versions of the original. Each smaller version passes through a color filter (either red, green or blue) onto a discrete section of the CCD array. The scanner software combines the data from the three parts of the CCD array into a single full-color image.

CIS scanners include an array of red, green and blue light emitting diodes ("LEDs") and a corresponding array of phototransistors. Together the arrays of LEDs and phototransitors are sometimes referred to as an image sensor array. Known image sensor arrays can include 600, 1200, 2400 or 4800 LEDs and phototransistors per inch (depending on resolution) and span the width of the scan area. Generally, the image sensor array is placed very close to the glass plate upon which rests the image to be scanned. Another version of the CIS scanner uses a single set of red, green, and blue LEDs in combination with light pipes to provide illumination of the material to be scanned. When the image is scanned, the LEDs combine to provide a white light source. The illuminated image is then captured by the row of sensors.

FIG. 1 shows an exemplary scanner 100 in a block diagram format. The scanner 100 includes a scanning element 104 that includes components such as a scan bar (not shown), and a calibration unit 106 that is used to calibrate the scanning element 104. In some embodiments, the calibration unit 106 includes a processing unit 108, a memory 112, and an averaging module 116. Although the memory 112 and the averaging module 116 are shown as external to the processing unit 108, the memory 112 and the averaging module 116 can also be internal to the processing unit 108. Furthermore, the calibration unit 106 can also be an internal module of the processing unit 108.

In a calibration process, which is detailed below, the processing unit 108 initially acquires a set of variation data or values of the scanning element, for example, from the memory 112. The scanning element 104 also performs a scan on a set of target image such as a test strip under a "white" condition followed by a "dark" condition, and generates respective outputs. The averaging module 116 then determines an average of the output based on the "white" condition scan, and another average of the output based on the "dark" condition scan. A gain module 120 and an offset module 124 then use the variation values, the averages, and an output dynamic range of an analog-front-end ("AFE") 128 to generate a percentage of freedom ("PF")or data freedom percentage (explained in greater detail below), a gain, and an offset for data that is received at the AFE 128. In some embodiments, the calibration unit 106 also includes a comparator 132 to compare different values, and a divider 136 to divide one value by another. For example, the comparator 132 can determine a difference between the averages, while the divider 136 can determine a quotient between the difference and an upper limit of the output dynamic value of the AFE 128.

Figure 2:
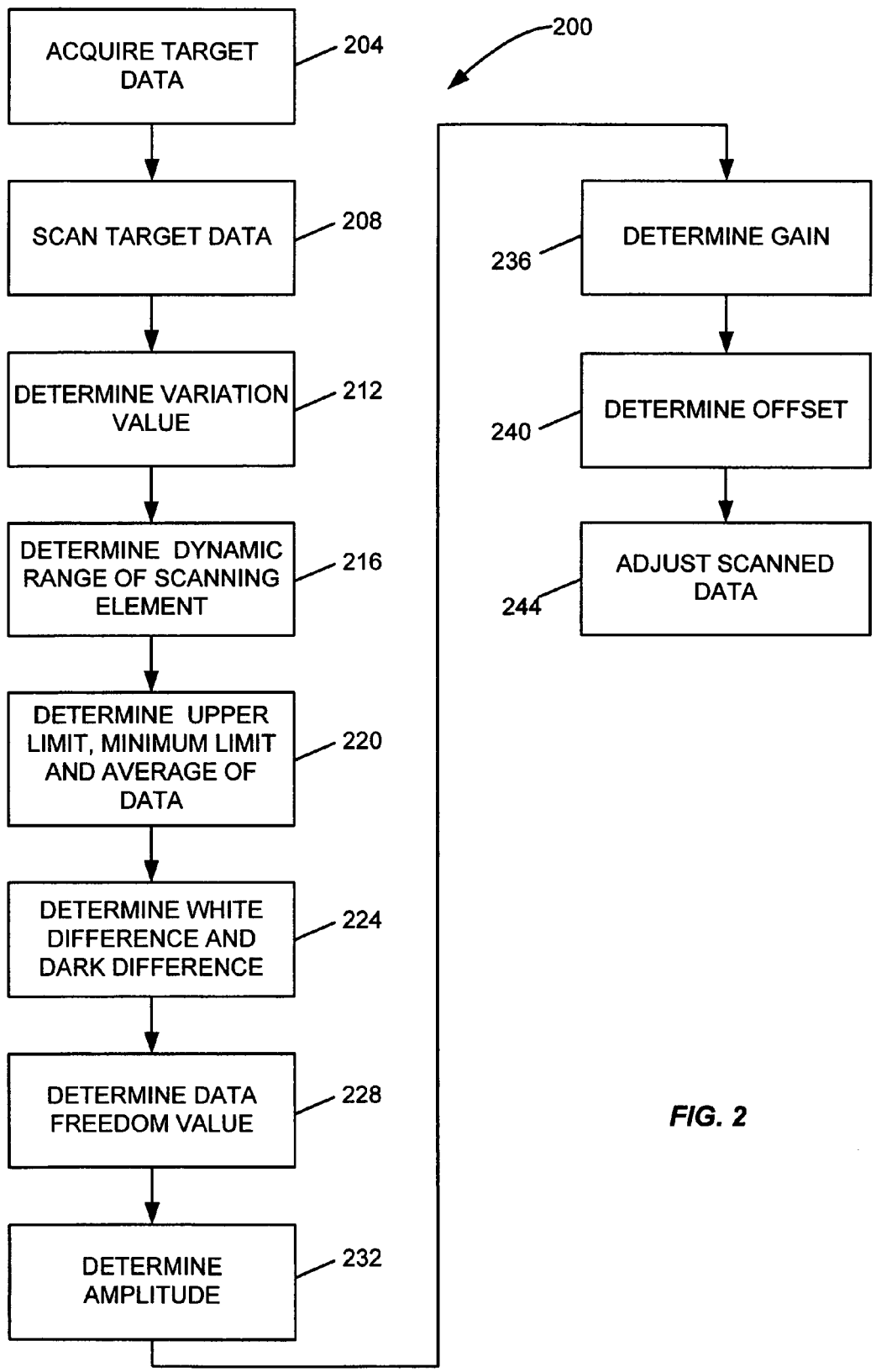
FIG. 2 is a flow chart of an exemplary calibration process.

FIG. 2 is a flow chart of an exemplary calibration process 200 that may be carried out by software, firmware, or hardware. Particularly, the calibration process 200 acquires a set of target data at block 204. The scanning element 104 (of FIG. 1) scans the target data (block 208 ) under both "white" and "dark" conditions, and generates respective outputs, $Data_{white}$ and $Data_{dark}$, respectively.

The calibration process 200 also determines variation values of the scanning element 104 at block 212. In some embodiments, the variation values include a photo-response non-uniformity ("PRNU") value that is a measure of output variation of the scanning element 104 during a "white" condition scan, and at least one of a maximum output value ("$V_{max}$") or a minimum output value ("$V_{min}$"). Particularly, the PRNU value is defined in EQ. (1) as follows.

$$PRNU = \frac{V_{max} - V_{mid}}{V_{mid}} \times 100\% \qquad \text{EQN. (1)}$$

wherein $V_{mid}$ is defined in EQ. (2) as follows:

$$V_{mid} = \frac{V_{max} + V_{min}}{2} \qquad \text{EQN. (2)}$$

For example, if the PRNU value is 40 percent, and $V_{max}$ is 1.5 V, a corresponding $V_{min}$ value of about 0.64 V can be determined.

Referring back to the calibration process 200 shown in FIG. 2, an output dynamic range of the scanning element 104 is determined at block 216 based on the variation values determined at block 212. Meanwhile, the averaging module 116 (of FIG. 1) also determines a plurality of averages of the scanned data ($Data_{white}$ and $Data_{dark}$) at block 220 based on different scan conditions. In some embodiments, the average is generally obtained by dividing a sum of all data values by a number of the data values. In other embodiments, the average is a rolling or moving average. The moving average is obtained by dividing a sum of weighted data values by a number of the weighted data values. In such cases, the data values are weighted to bias the average toward a maximum or minimum. In the embodiment shown, the average under the "white" scan condition ($Average_{white}$), and the average under the "dark" scan condition ($Average_{dark}$) are obtained at block 220. (However, other types of averaging techniques can also be used.) The calibration process 200 also determines both the maximum and minimum of the scanned data (MAX [$Data_{white}$] and MIN[$Data_{dark}$]) at block 220 under respective "white" and "dark" scan conditions.

Thereafter, the calibration process 200 determines a white difference between the maximum value of the scanned data and the average under the "white" scan condition ($Average_{white}$) at block 224. The calibration process 200 also determines a dark difference between the minimum value of the scanned data and the average under the "dark" scan condition ($Average_{dark}$) at block 224. For example, if the maximum data value of the scanned data is 1.5 V, and the average under the "white" scan condition ($Average_{white}$) is determined to be 0.8 V, the white difference is 0.7 V. The calibration process 200 then generates a percentage of freedom or data freedom value (PF) at block 228 by comparing the difference with an output dynamic range of the AFE which includes both upper and lower limits (Upper limit, Lower limit) of the outputs of the AFE 128. For example, if the output of the AFE 128 has a dynamic range of 3 V, and the difference between the value of the maximum data point that has a value of 1.5 V and the Average having a value of 0.8 V, is 0.7 V, the data freedom value is 0.7V/3.0V=0.2333 or 23.33 percent of the dynamic range of the AFE 128. However, rather than using an exact value, the data freedom value is generally set or chosen to be slightly greater than the value obtained so that calibrated data values determined from the data freedom value will be less than the Upper Limit. This provides an option to accommodate or adjust for variations in the scanbars and/or limitations in numerical precision of the processor or other system being used. For example, if the data freedom value is set to have a value of 25 percent in the above example (instead of 23.33 percent), the dynamic range of the output of the AFE 128 can be covered even for data values of scanbars that exhibit output characteristics approaching or equaling the dynamic range of the AFE 128, even though a data freedom value of 25 percent does not result in optimal calibration.

In some embodiments, the data freedom value under "white" scan condition ($PF_{white}$) is defined in EQ. (3) as follows.

$$PF_{white} = \left\lceil \frac{MAX[Data_{white}] - Average_{white}}{UpperLimit} \right\rceil \qquad \text{EQN. (3)}$$

where the brackets ⌈ ⌉ represents the ceiling of the value contained therein. The data freedom value under "dark" scan condition ($PF_{dark}$) is defined in EQ. (4) as follows.

$$PF_{dark} = \left\lceil \frac{MIN[Data_{dark}] - Average_{dark}}{UpperLimit} \right\rceil \qquad \text{EQN. (4)}$$

The calibration process 200 determines an amplitude (Amplitude) or a dynamic range of the averages at block 232. In the embodiment shown, the dynamic range of the averages is determined by comparing the average under the "white" scan condition ($Average_{white}$) and the average under the "dark" scan condition ($Average_{dark}$). Particularly, the amplitude is defined in EQN. (5) as follows.

$$\text{Amplitude} = Average_{white} - Average_{dark} \qquad \text{EQN. (5)}$$

A gain and an offset for data output by the scanning element 104 (input to the AFE 128) are subsequently determined at blocks 236, 240, respectively. In the embodiment shown, the gain is determined from parameters such as the amplitude, the dynamic range of the output of the AFE 128, the scanned data, and the data freedom value (PF). Particularly, the gain is defined in EQN. (6) as follows.

$$\text{Gain} = -\frac{\left(\left(\frac{UpperLimit \times PF_{white}}{MAX[Data_{white}]}\right) - 1\right) \times UpperLimit}{\text{Amplitude}} \qquad \text{EQN. (6)}$$

Similarly, the offset is determined from parameters such as the dynamic range of the output of the AFE 128, the averages, and the data freedom value (PF), as shown in EQN. (7), below.

$$\text{Offset} = Average_{dark} - PF_{dark} \times Upperlimit \qquad \text{EQN. (7)}$$

With the offset and the gain, the calibration process 200 can proceed to calibrate the scanner 100, or the AFE 128 at block 244. Particularly, values of the scanned data generated by the scanning element 104 are adjusted based on the offset and the gain. The adjusted data generated from the scanning element 104 has a dynamic range that better matches the output dynamic range of the AFE 128. The adjusted analog data is then fed to the AFE 128 to be converted into its digital equivalent.

Figure 3:
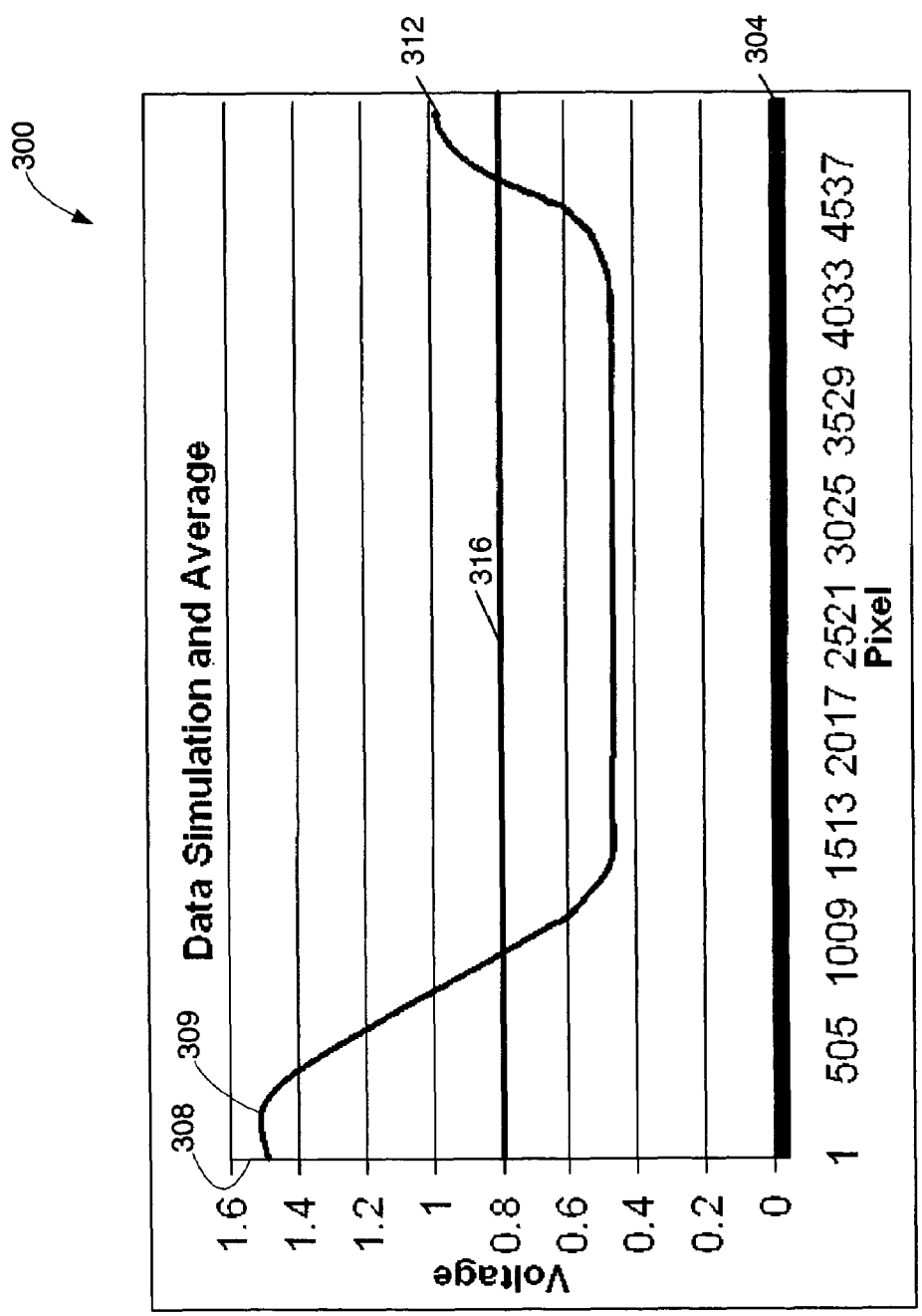
FIG. 3 is an exemplary plot of the scanned values of the target data for all pixels sensed.

FIG. 3 shows a scanning simulation in exemplary plot 300 of the values of the scanned target data for all pixels sensed by the scanning element 104. Pixel numbers 1 through 5100 are listed along an x-axis 304, whereas voltage values are measured along a y-axis 308. Plot 300 shows a curve 312 of the simulated values of the scanned data that has a maximum value of about 1.5 V at 309. This simulated curve is representative of the response of a typical eight and one half inch scanbar having a resolution of 600 dpi. The simulated scanned data has an average of 0.8 V, as shown in curve 316. Therefore, the difference between the maximum value of 1.5 V and the average value of 0.8 V is 0.7 V. The difference of 0.7 V can be used to determine the data freedom value, as described above.

Figure 4:
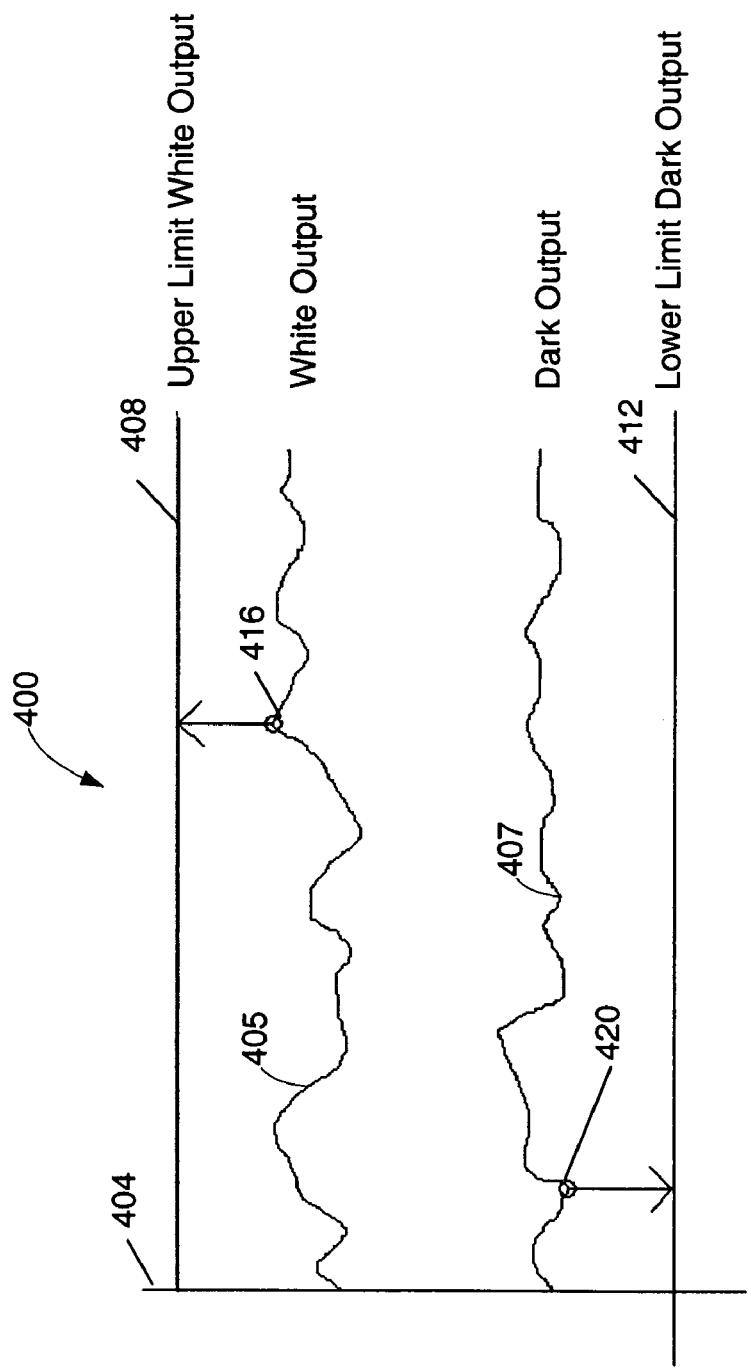
FIG. 4 is a plot of data before calibration.
Figure 5:
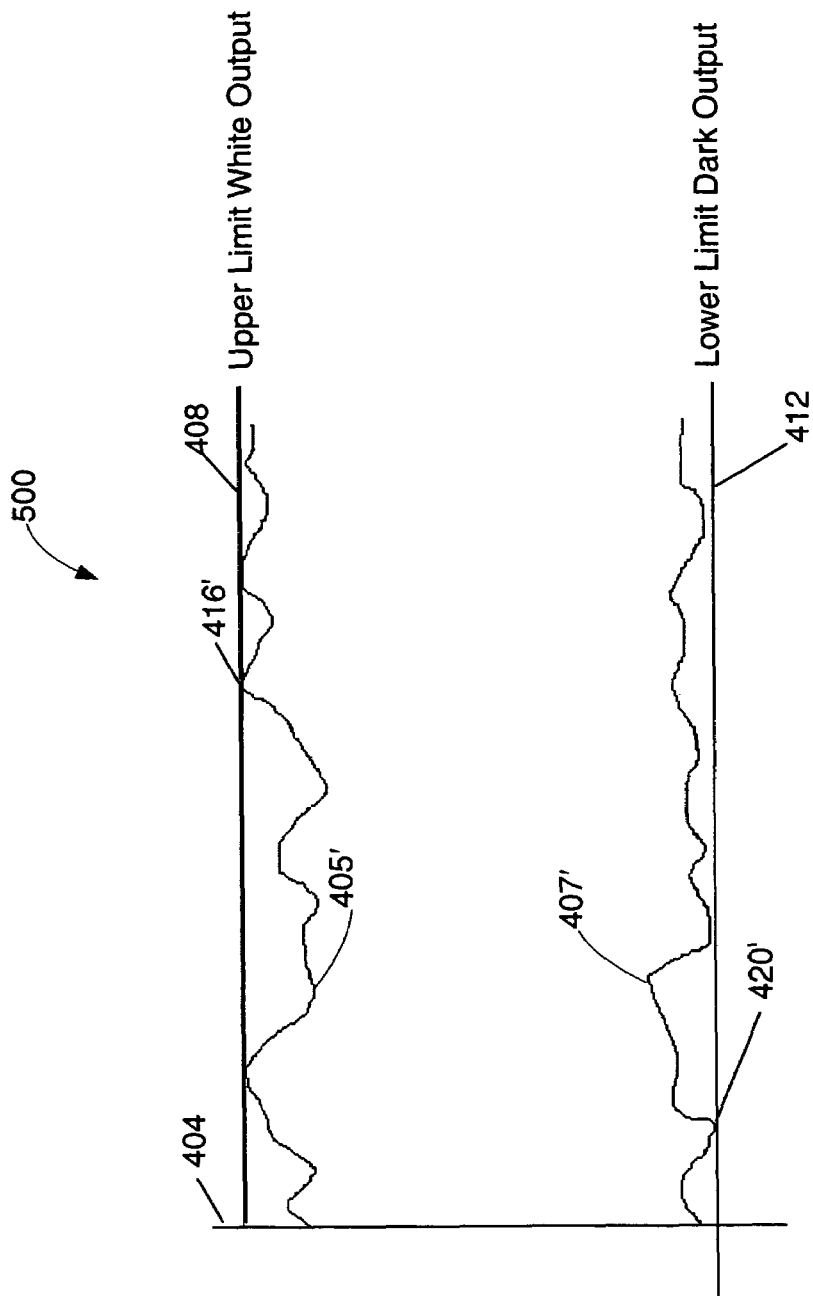
FIG. 5 is a plot of data after calibration.
Figure 6:
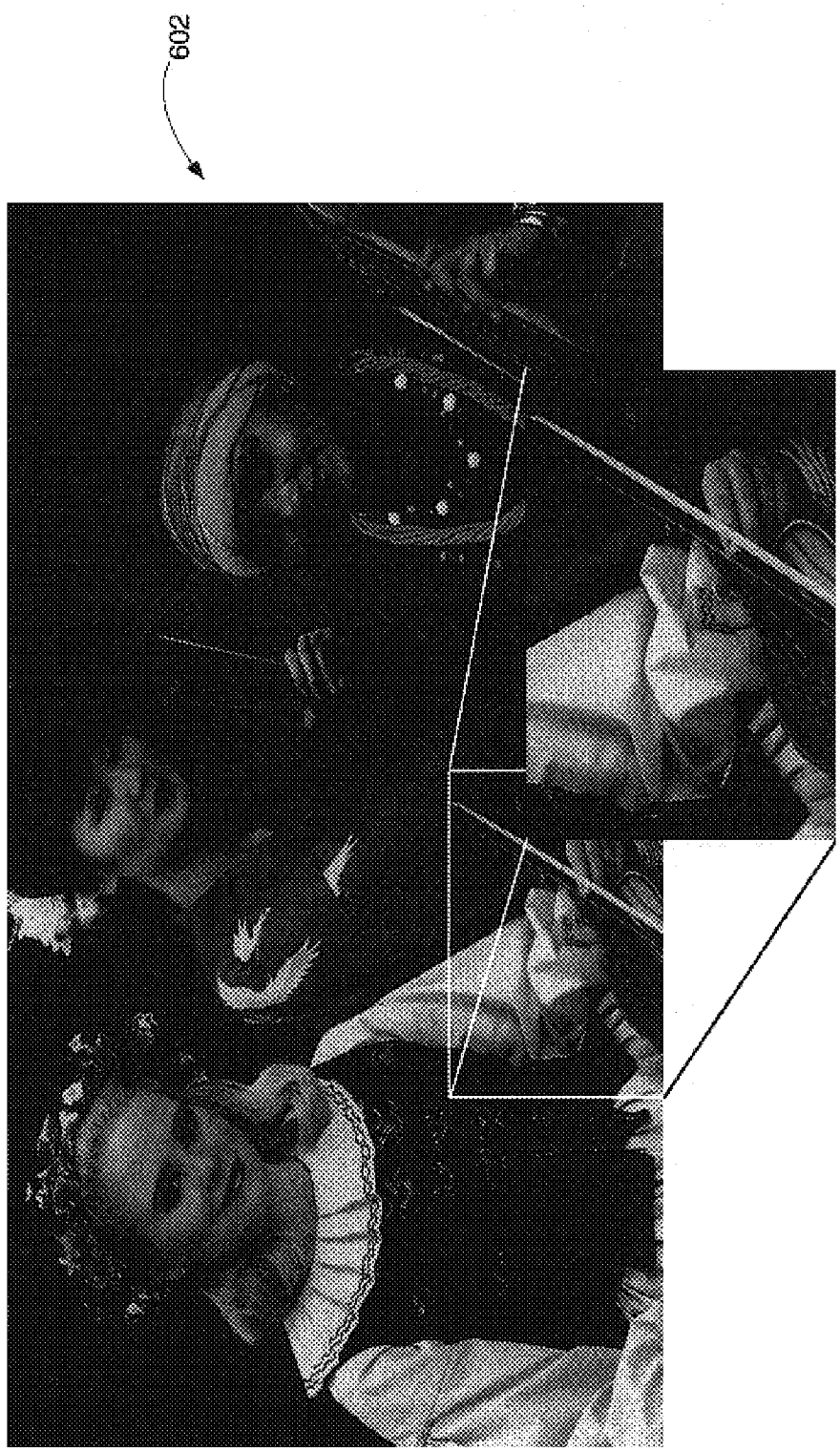
FIG. 6 is a scanned image after calibration.

FIGS. 4 and 5 show plots 400 and 500 of data before and after an application of an improved calibration for the AFE 128, respectively. Particularly, data values are measured along a y-axis 404. Plot 400 shows that before the application of an improved calibration, the white output plot 405 values and the dark output plot 407 values of the data have a dynamic range that does not fully match a dynamic range derived from upper and lower limits 408 and 412 of the outputs of the AFE 128, for example, 0-3 V. A more optimal calibration, therefore, is one that matches a maximum value at 416 and a minimum value at 420 with the upper and lower limits 408 and 412, respectively. After the application of this method, and as shown in FIG. 5, the maximum and minimum values 416' and 420' contained in white output plots 405' and dark output plots 407', respectively match the upper limit 408 and the lower limit 412, respectively. FIG. 6 shows a scanned image 602 after the application of a more optimal calibration of the AFE 128. As illustrated the colors have a richer tone and depth in contrast to those shown in scanned image 900.

Figure 7:
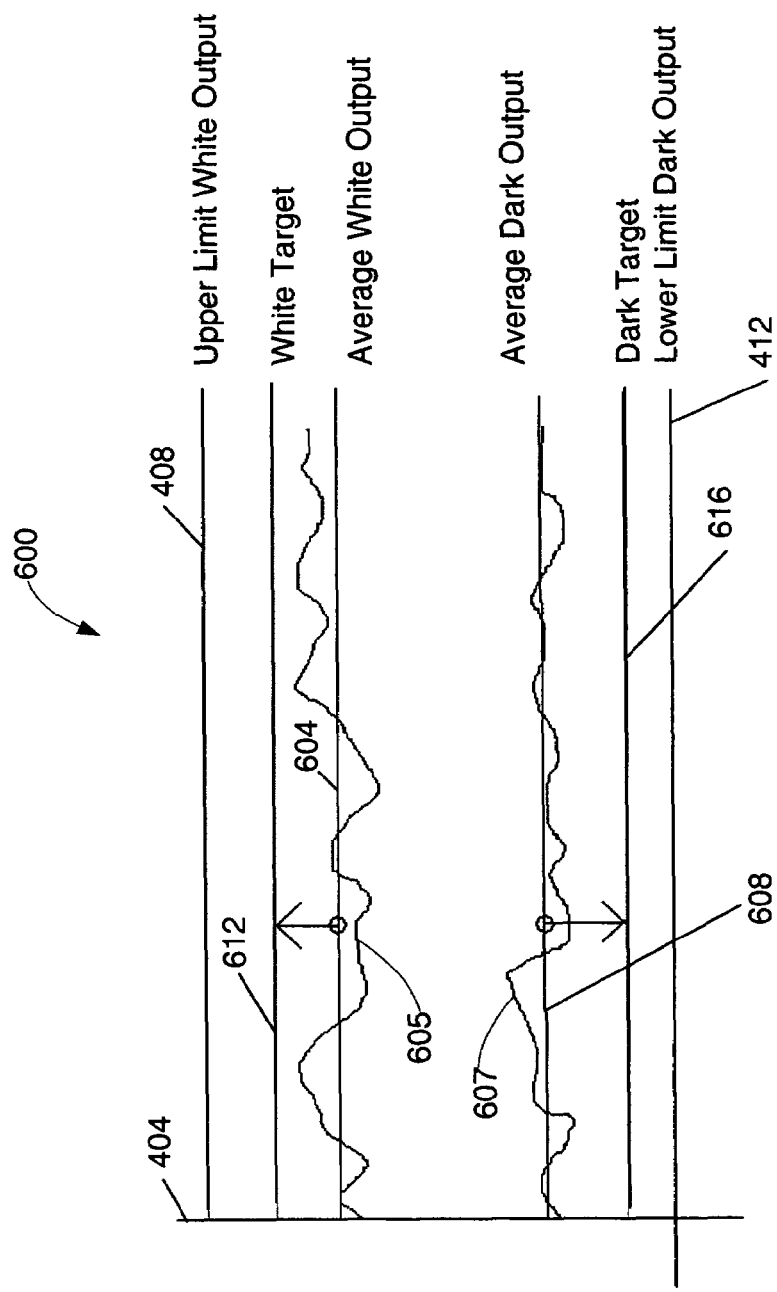
FIG. 7 is a plot of data before a suboptimal calibration.
Figure 8:
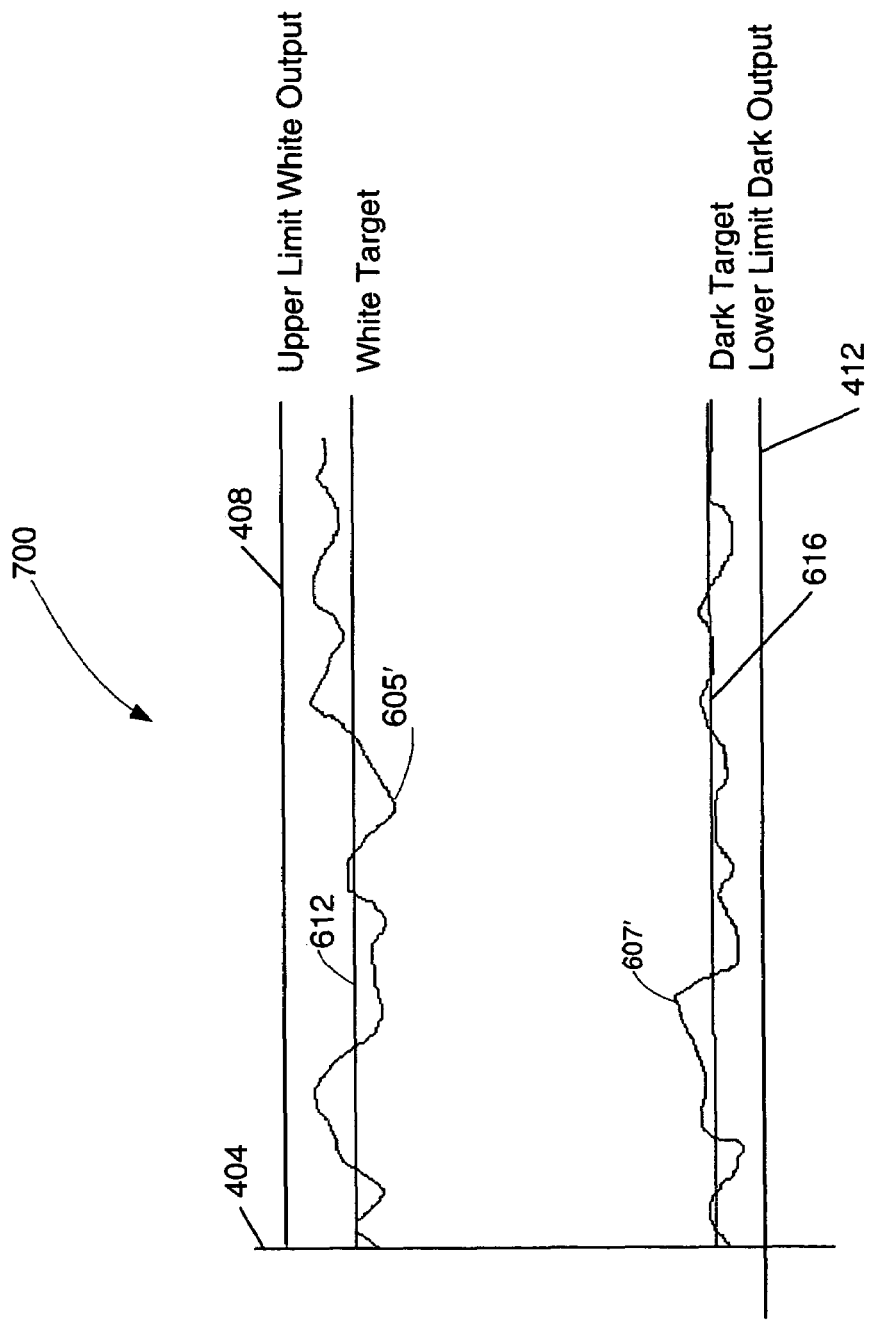
FIG. 8 is a plot of data after a suboptimal calibration.
Figure 9:
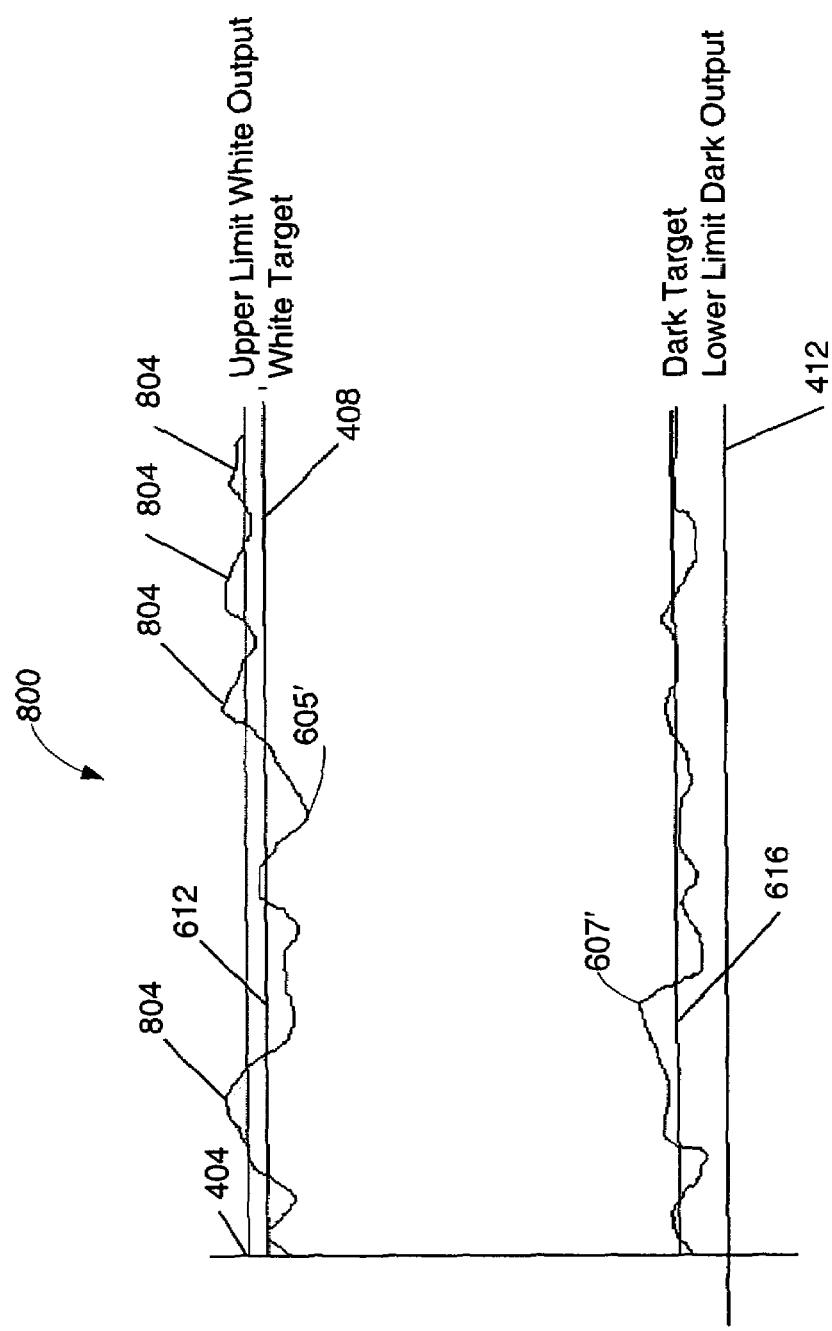
FIG. 9 is a failed calibration plot.
Figure 10:
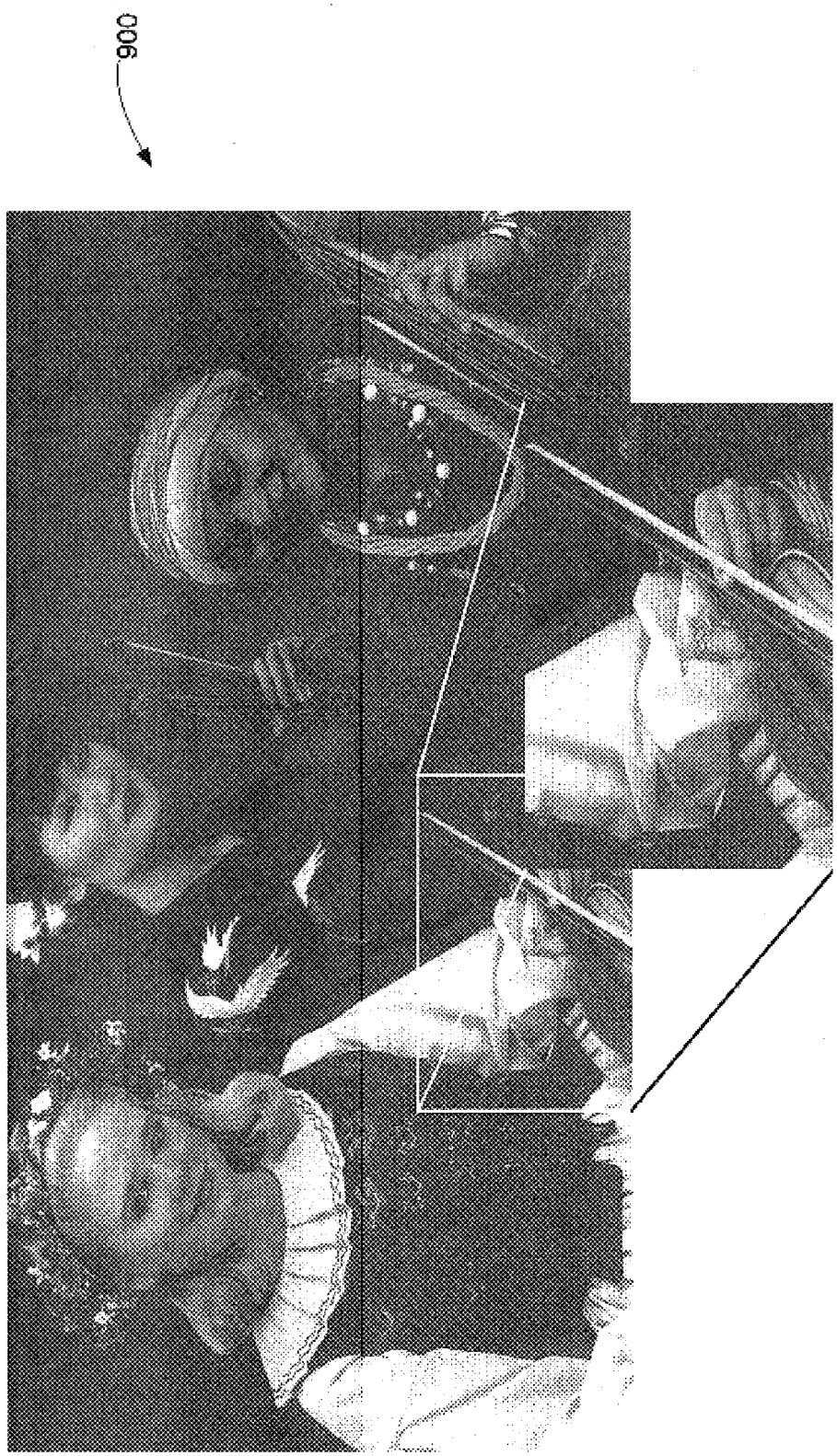
FIG. 10 is a scanned image after a suboptimal calibration.

FIGS. 7 and 8 show plots 600 and 700 of data before and after an application of a suboptimal calibration for the AFE 128, respectively. Again, values of the data are measured along a y-axis 404. Plot 600 shows that before the application of a suboptimal calibration, the white output values 605 and the dark output values 607 have a dynamic range that does not utilize a dynamic range derived from upper and lower limits 408 and 412 of the outputs of the AFE 128. Plot 600 also shows an average white output line 604, and an average dark output line 608 developed with the suboptimal calibration as discussed. The suboptimal calibration, as mentioned, seeks to move the average white output line 604 and the average dark output line 608 to a predetermined white target line 612, and a predetermined dark target line 616, respectively. Plot 700 of FIG. 8 shows that calibrated white data values 605' averaged around the white target line 612 are below the upper limit 408 after the application of the suboptimal calibration. Similarly, plot 700 also shows that calibrated dark data values 607' averaged around the dark target line 616 are above the lower limit 412 after the application of the suboptimal calibration. However, as depicted in FIG. 9 (which shows a failed calibration plot 800), in calibrated white data plot 605' some of the calibrated white data values 804 averaged around the white target line 612 are above the upper limit 408 after the application of the suboptimal calibration due to an incorrect selection of the white target line 612. Clipping occurs once the inadequately calibrated data is fed to the AFE 128. Particularly, data 804 with values above the upper limit 408 attains values of the upper limit 408. As a result, scan quality is degraded. FIG. 10 shows a scanned image 900 after the application of the suboptimal calibration for the AFE 128, as discussed. As illustrated the image has a faded or washout quality to it.

The foregoing description of embodiments of the invention has been presented for purposes of illustration. It is not intended to be exhaustive or to limit the invention to the precise steps and/or forms disclosed, and modifications and variations are possible in light of the above teaching. It is intended that the scope of the invention be defined by the claims appended hereto.

What is claimed is:

1. A method of calibrating a scanner having a scanning element and an analog front end (AFE), the AFE having an output dynamic range, method comprising:
    scanning data with the scanning element;
    determining an intermediate value of the scanned data, the intermediate value is being determined by calculating a first average of white data, and a second average of dark data;
    determining a variation value of the scanning element;
    determining an upper limit of the AFE; and
    determining a data freedom value based on the intermediate value, the variation value, and the upper limit.

2. The method of claim 1, further comprising determining an offset and a gain based on the data freedom value.

3. The method of claim 2, wherein determining the gain comprises determining a difference between the first and second averages.

4. The method of claim 2, wherein determining the intermediate value of the scanned data comprises determining an average of dark data, and wherein determining the offset comprises:
    determining an upper limit of the AFE;
    determining a product between the data freedom value and the upper limit; and
    determining a difference between the average of dark data and the product.

5. The method of claim 1, wherein determining the variation value of the scanning element comprises determining at least one of a photo-response non-uniformity value, a maximum output value, and a minimum output value of the scanning element.

6. The method of claim 1, wherein the AFE has an output dynamic range that has an upper limit, and wherein determining the data freedom value comprises:
    determining at least one of a maximum and a minimum of the scanned data;
    determining a difference between the intermediate value and the at least one of a maximum and a minimum; and
    dividing the difference by the upper limit.

7. The method of claim 1, wherein determining the intermediate value of the scanned data comprises determining at least one of an average of the scanned data, and a rolling average of the scanned data.

8. A method of calibrating a scanner with a set of data, the scanner having a scanning element, the method comprising:
    determining a signal range of the scanning element;
    determining an average of the data, the average is being determined by calculating a first average of white data, and a second average of dark data;
    determining a data freedom value based on the average, the data, and the signal range; and
    adjusting data generated by the scanning element based on the data freedom value.

9. The method of claim 8, wherein adjusting data generated by the scanning element comprises:
    determining an offset and a gain based on the data freedom value;
    subtracting from data generated by the scanning element the offset to obtain offset data; and
    multiplying the offset data with the gain.

10. The method of claim 9, wherein determining the offset and the gain comprises:

determining a difference between the first and second averages;

determining an upper limit of an AFE configured to receive data from the scanning element;

determining a product between the data freedom and the upper limit; and determining a difference between the average and the product.

11. The method of claim 8, wherein determining a signal range of the scanning element comprises determining at least one of a photo-response non-uniformity value, a maximum output value, and a minimum output value, of the scanning element.

12. The method of claim 8, wherein the scanner has an AFE configured to receive data from the scanning element, wherein the AFE has an output dynamic range, wherein the output dynamic range has an upper limit, and wherein determining the data freedom value comprises:

determining at least one of a maximum and a minimum of the scanned data;

determining a difference between the average and the at least one of a maximum and a minimum; and dividing the difference by the upper limit.

13. The method of claim 8, wherein determining the average of the scanned data comprises determining a rolling average of the scanned data.

14. A scanner comprising:

a scanning element configured to acquire data;

an analog front end (AFE) configured to receive data from the scanning element, the AFE having an output dynamic range including an upper limit;

a memory configured to store a variation value of the scanning element;

an averaging module coupled to the scanning element, and configured to receive the scanned data, and to determine an intermediate value of the scanned data, wherein the intermediate value of the scanned data comprises a first average of white data, and a second average of dark data; and a processing unit configured to determine a data freedom value based on the intermediate value, the variation value, and the upper limit.

15. The scanner of claim 14, wherein the processing unit is further configured to determine an offset and a gain based on the data freedom value.

16. The scanner of claim 15, the scanner further comprises a gain module configured to determine the gain from a difference between the first and second averages.

17. The scanner of claim 14, further comprising an AFE configured to receive data from the scanning element.

18. The scanner of claim 14, wherein the variation value of the scanning element comprises at least one of a photo-response non-uniformity value, a maximum output value, and a minimum output value, of the scanning element.

19. The scanner of claim 14, further comprising:

an AFE configured to receive data from the scanning element, wherein the AFE has an output dynamic range including an upper limit; and a comparator configured to determine a difference between the intermediate value and at least one of a maximum and a minimum of the scanned data; and a divider configured to divide the difference by the upper limit.

20. The scanner of claim 14, wherein the intermediate value of the scanned data comprises at least one of an average of the scanned data, and a rolling average of the scanned data.

* * * * *